United States Patent [19]

Brollo

[11] 4,147,582
[45] Apr. 3, 1979

[54] APPARATUS FOR PRODUCING INSULATING PANELS

[76] Inventor: Giuseppe Brollo, Piazza Achille Grandi, Solaro (Milano-Italia), Italy

[21] Appl. No.: 805,953

[22] Filed: Jun. 13, 1977

[30] Foreign Application Priority Data

Sep. 9, 1976 [IT] Italy ............................... 27823 A/76

[51] Int. Cl.$^2$ ........................ B30B 5/06; B30B 15/02
[52] U.S. Cl. .................................. 156/462; 29/33 K; 29/33 S; 29/779; 156/549; 156/555; 156/580; 156/582; 156/79; 425/335; 425/817 C
[58] Field of Search .................. 29/779, 33 R, 33 K, 29/33 S, 564.1; 425/505, 417, 4 C, 114, 329, 335, 336, 363, 817 C; 428/174, 313, 320, 71; 156/40, 79, 461, 462, 499, 510, 543–545, 549, 555, 580, 582, 500; 264/46.2

[56] References Cited

U.S. PATENT DOCUMENTS

| | | | |
|---|---|---|---|
| 2,670,515 | 3/1954 | Wigley | 425/329 |
| 3,214,793 | 11/1965 | Vidal | 264/51 |
| 3,643,306 | 2/1972 | Massagli et al. | 264/46.2 X |
| 3,840,960 | 10/1974 | Toti | 29/779 |
| 3,846,054 | 11/1974 | Davis | 156/79 |
| 3,878,027 | 4/1974 | Troutner | 156/580 |
| 4,024,309 | 5/1977 | Pender et al. | 428/313 |
| 4,051,209 | 4/1977 | Tabler | 428/313 |

*Primary Examiner*—Michael G. Wityshyn
*Attorney, Agent, or Firm*—Allison C. Collard; Thomas M. Galgano

[57] ABSTRACT

An apparatus for the continuous production of prefabricated insulating panels is provided, which includes a feeding station for a lower metal sheet and for an upper metal sheet, a rolling-mill train for shaping the sheets, a furnace for heating the sheets, a device for injecting expandable plastic material between the sheets, a joining unit for joining the sheets together and for holding the expanded plastic material in place, and a cutter for cutting the finished panels. The joining unit has two, link-type upper and lower conveyors for the sheets shaped by the rolling-mills, at least one of which is adjustable, so that the distance between them may be regulated according to the thickness of the panel, with the conveyors being arranged to revolve continuously around rollers which rotate about a horizontal axis. An article produced by the apparatus is also provided.

10 Claims, 18 Drawing Figures

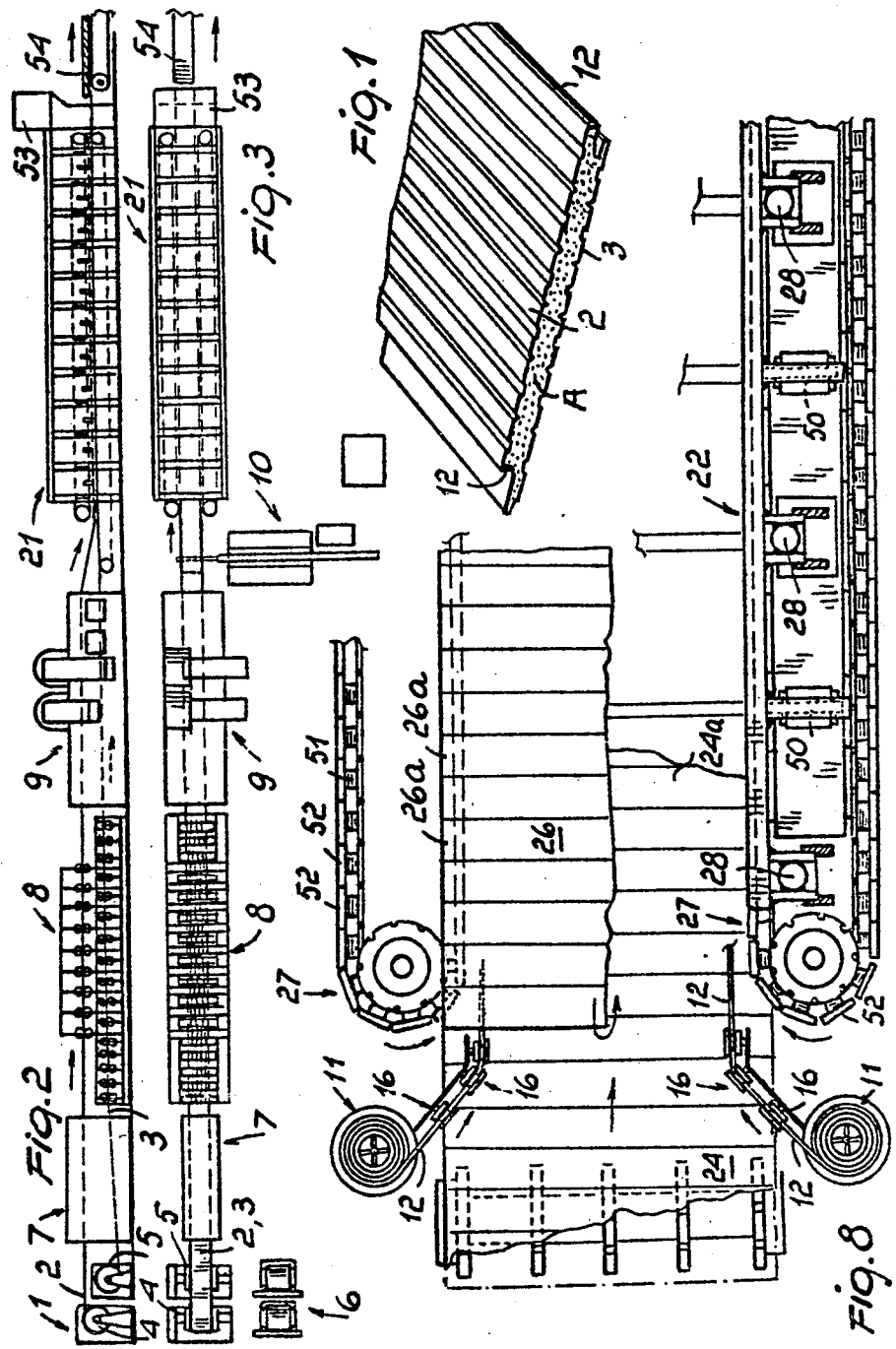

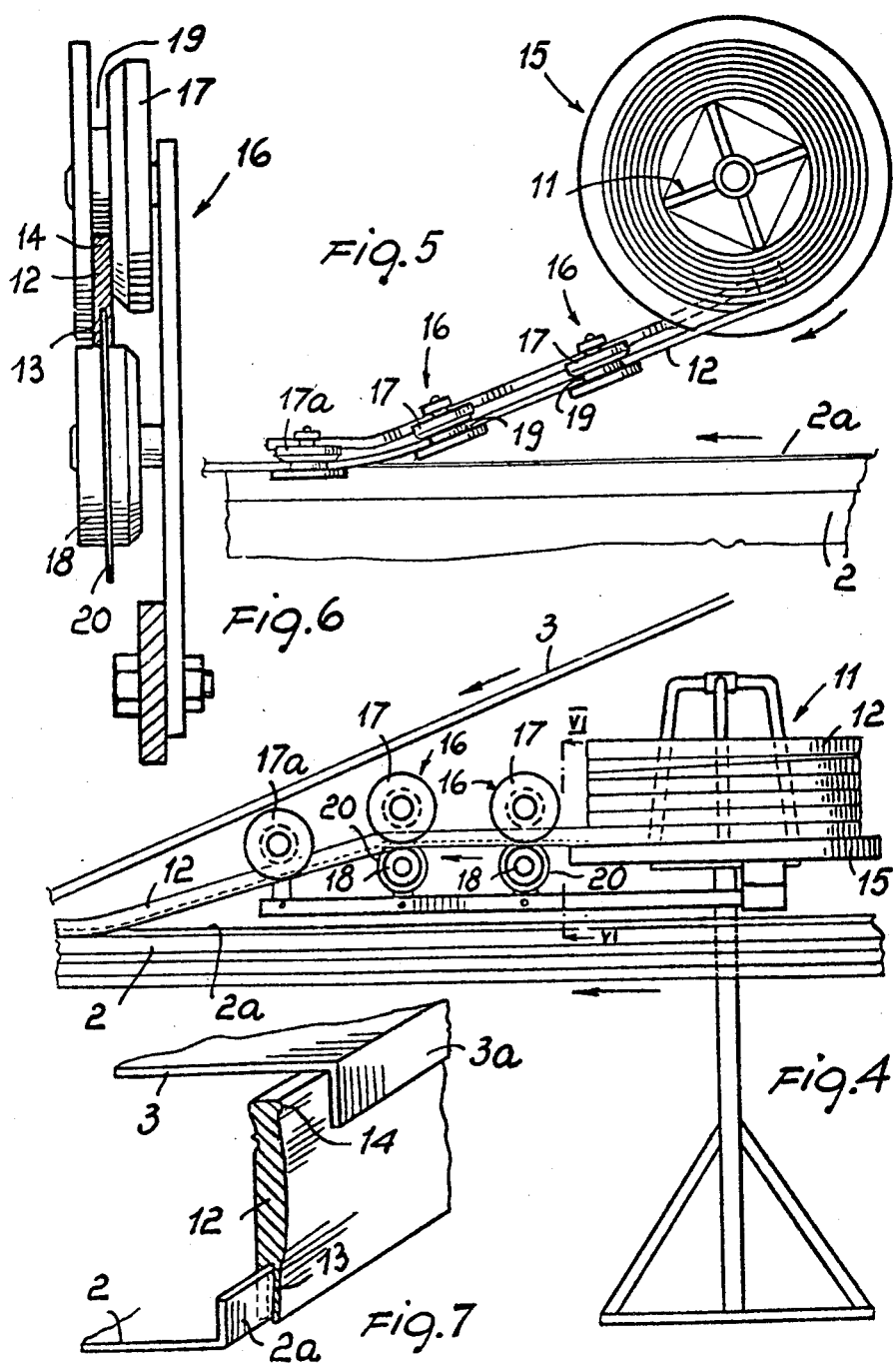

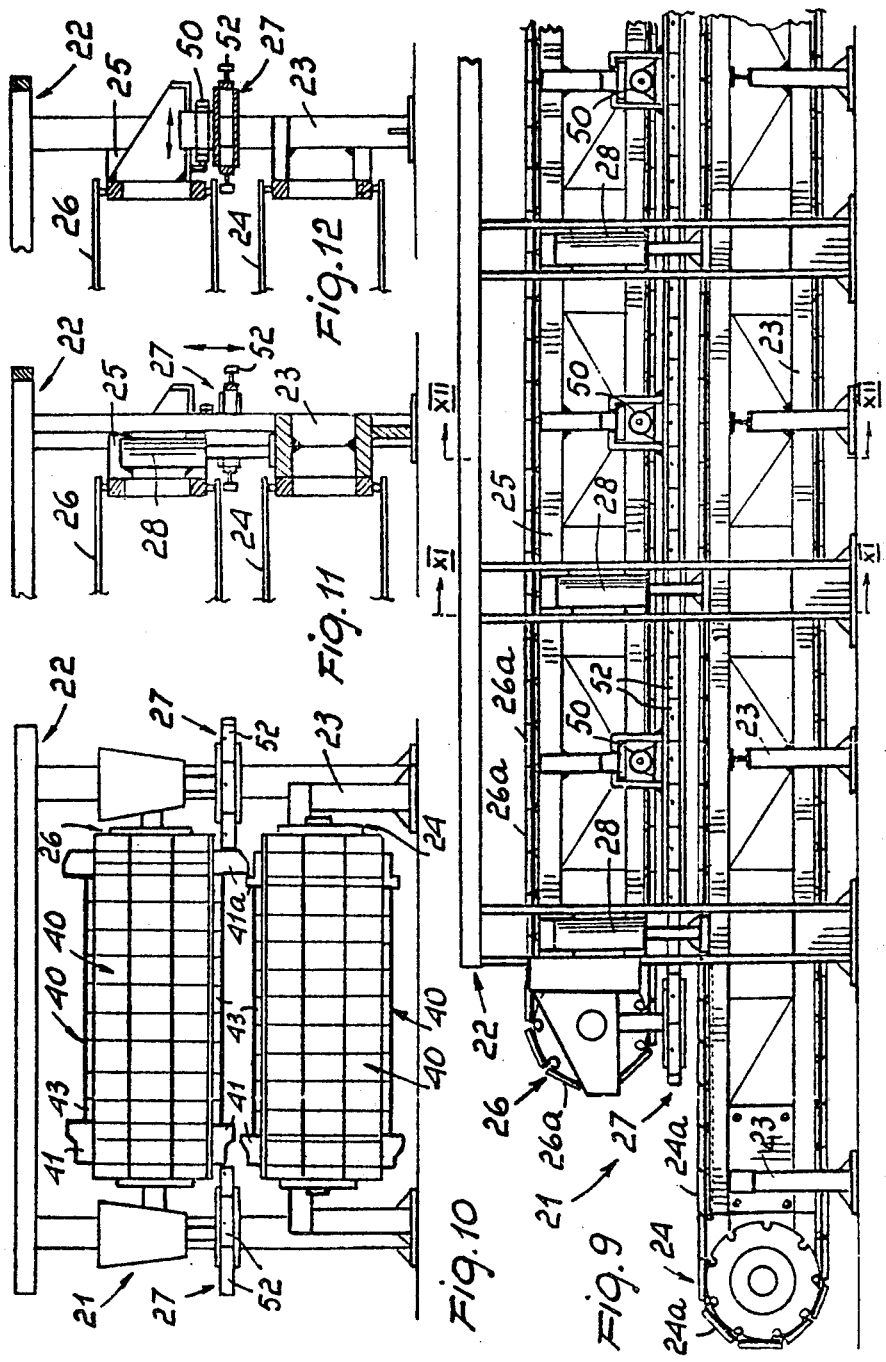

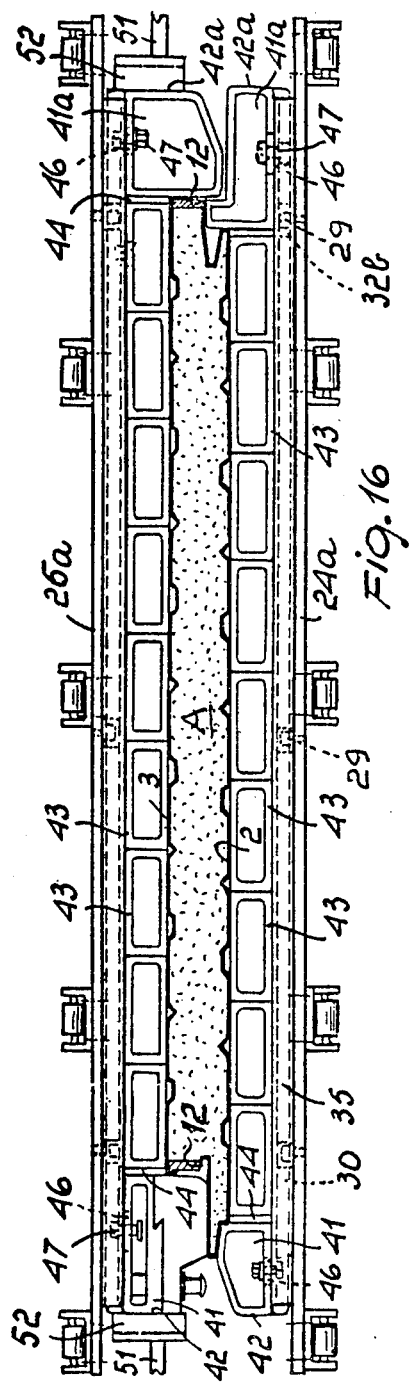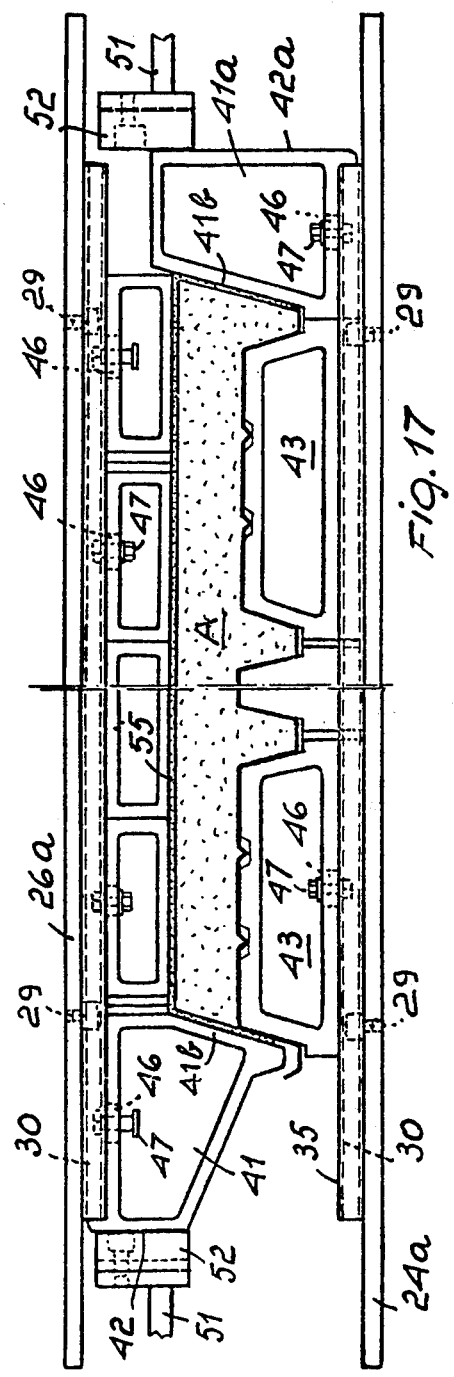

APPARATUS FOR PRODUCING INSULATING PANELS

The present invention relates to an apparatus for producing insulating panels and the panels produced thereon.

Prefabricated insulating panels are currently in use, consisting of an upper and lower metal sheet joined along their side edges, for example, with clips. Between the two sheets a plastic material, which is expandable during the stage when the sheets are joined together, is injected.

These panels can be produced in several shapes, i.e., the upper and lower sheets can be so shaped as to produce a number of different longitudinal corrugations.

Since it is necessary during the expansion stage of the plastic material that both the lower and upper sheets are held accurately in place, if it is desired to change the shape of the panel, the shapes of the sections which hold the panels in place have to be altered by a process which is both long and complicated, since these holding sections are mounted on a pair of rollers which advance the panel a certain distance.

At present, in order to modify the shape of the panel, the manufacturer is obliged to halt production for a considerable time, so as to have the necessary time for substituting all the holding sections which, for the reasons given above, are numerous.

Another problem arising with these panels is that when they are assembled, there is direct contact between the sheets. Thus, the insulating material has to be inserted into the panel joints.

According to the present invention, there is provided an apparatus for the continuous production of prefabricated insulating panels, comprising a feeding station for a lower metal sheet and for an upper metal sheet, a rolling-mill train for shaping the sheets, a furnace for heating the sheets, a device for injecting expandable plastic material between the sheets, a joining unit for joining the sheets together and for holding the expanded plastic material in place, and a cutter for cutting the finished panels. The joining unit has two, link-type conveyors, a lower and an upper conveyor, for the sheets shaped by the rolling-mills, the distance between them being regulated according to the thickness of the panel. The conveyors are arranged to revolve continuously around rollers which rotate about a horizontal axis.

The unit may also have two pressure units mounted on chains, which are continuously driven by rollers rotating around a vertical axis, and thrusters which act sideways on the sheets. Each of the conveyor links may include a dovetail connecting-section, which lies along the length of the link and engages with a support plate to which can be attached a series of detachable blocks for forming the trains, which are to have the same shape as the corresponding sheet. These trains are rapidly interchangeable through lateral coupling with other trains of differing shapes, depending on the shape of the sheets which are designed according to market demand.

A further characteristic of the invention concerns the stage following the injection of the expandable plastic material, where a strip of elastomeric material is inserted between the upper and lower sheets. This strip is the connecting element between the upper and lower sheets, and also forms a part of the side edge of the finished panel.

Other objects and features of the present invention will become apparent from the following detailed description considered in connection with the accompanying drawings which disclose the embodiments of the invention. It is to be understood, however, that the drawing is designed for the purpose of illustration only and not as a definition of the limits of the invention.

In the drawings, wherein similar reference characters denote similar elements throughout the several views:

FIG. 1 is a perspective of a shaped panel according to the invention;

FIG. 2 is a side, elevational view of the apparatus according to the invention;

FIG. 3 is a top elevational view of the apparatus;

FIG. 4 is a side, elevational view of one of the bilateral units for inserting the elastomeric strip;

FIG. 5 is a top, elevational view of the unit shown in FIG. 4;

FIG. 6 is a sectional view in part elevation, taken along line VI—VI in FIG. 4;

FIG. 7 is an enlarged, fragmentarily-illustrated, perspective view of the detail of a bilateral joint between the lower and upper sheet;

FIG. 8 is a fragmentarily-illustrated, top elevational view of the unit which connects and holds in place the upper and lower sheets;

FIG. 9 is a side, elevational view of FIG. 8;

FIG. 10 is a front, elevational view of FIG. 8;

FIG. 11 is a sectional view taken along line XI—XI in FIG. 9;

FIG. 12 is a sectional view taken along line XII—XIII in FIG. 9;

FIG. 16 is a cross-sectional view of the unit shown in FIG. 8, which includes the moving panel;

FIG. 17 is a cross-sectional view similar to FIG. 16, with different-shaped panel and of a different manufacture.

Figure 13:
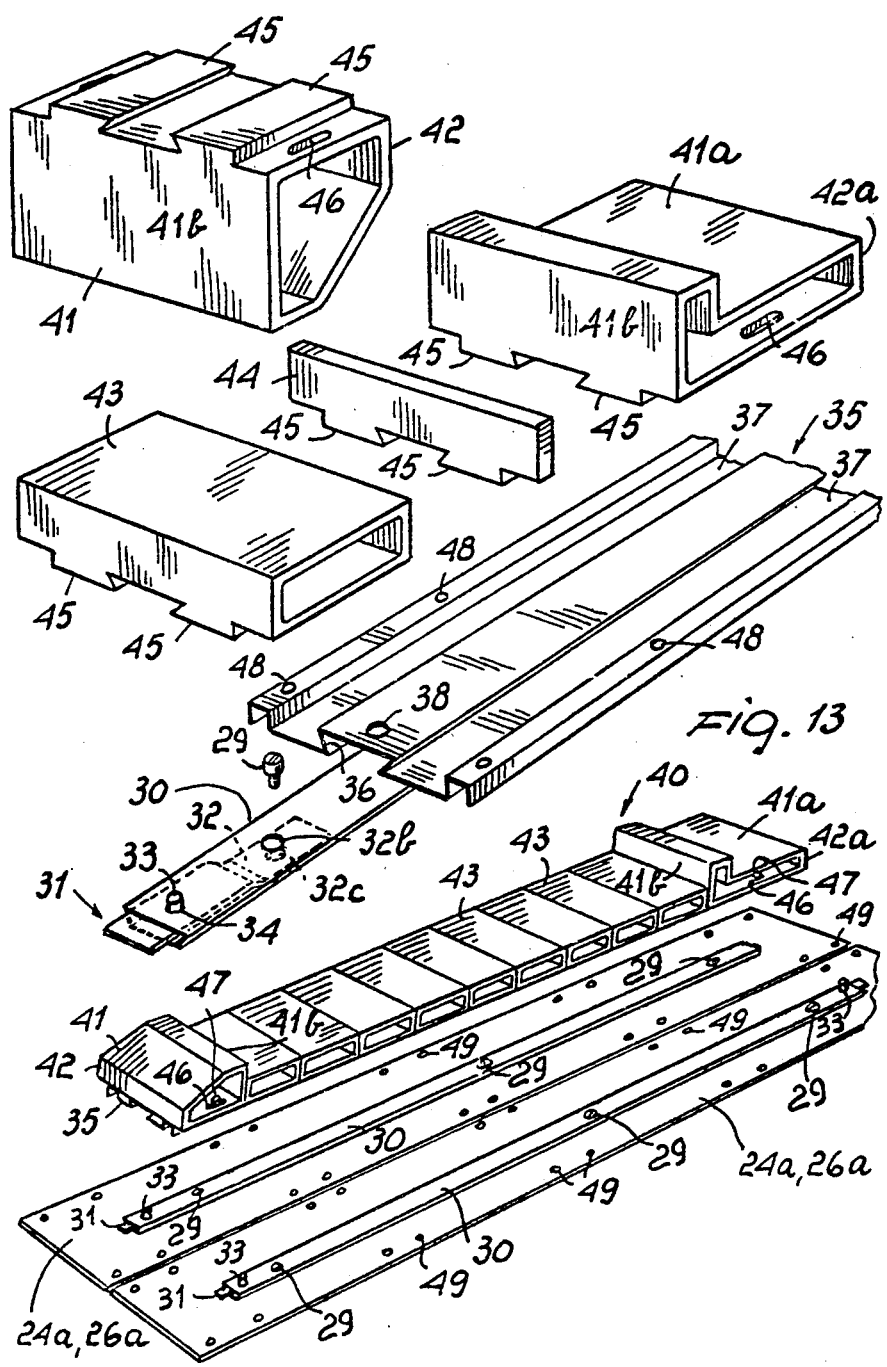
FIG. 13 is an exploded view of the interchangeable holding sections of the unit shown in FIG. 8.

With reference to these Figures, the apparatus comprises a feeding station 1 for an upper sheet 2 and for a lower sheet 3. More precisely, the sheets unroll from two feed bobbins 4 and 5; adjacent to bobbins 4 and 5 are reserve bobbins 6.

Following the feeding station 1, the sheets 2 and 3 are transported to a storage unit 7, which in practice functions as a reservoir to guarantee a continuous feeding of the sheets; the unit is also fitted with a splice for connecting the ends of two consecutive bobbins.

Sheets 2 and 3 are, in turn, led into a series of rolling-mills 8, which shape the sheets according to the shape desired. When they leave rolling-mills 8, the sheets, which move in parallel, disposition one above the other, enter a furnace 9, which at its other end, has a device fitted at the side 10 for the injection of expandable plastic material A between sheets 2 and 3, which are still separate. The parts of the plant mentioned above, have only been briefly described, since they are of types currently in use.

Following the conventional type injection of the expandable plastic material, the apparatus includes a device 11, which includes two, bilateral units (FIGS. 4, 5 and 6) for inserting between the lower sheet 2 and the upper sheet 3 a rubber strip 12, which serves to connect sheet 2 to sheet 3. More precisely, strip 12 has an incision 13 on one side, and a protusion 14 on the opposite side, which are positioned in the panel in such a way that incision 13 sits astride the upturned edge 2a of sheet 2, and protusion 14 rests beside turned edge 3a of sheet 3. Turned edges 2a and 3a are suitably produced during the passage of sheets 2 and 3 through the rolling-mills. The unit 11 includes a pair of spools 15, fitted bilaterally to sheets 2 and 3, around which strip 12 is rolled sideways.

Spools 15, which revolve around their axis, feed strip 12 by means of conveyor guides 16 on to turned edges 2a and 3a of sheets 2 and 3.

Each guide 16 has an upper 17 and lower 18 pulley, placed one above the other in parallel axis; pulley 17 and an end pulley 17a have a groove 19 (FIG. 6), into which fits protusion 14 of strip 12 (FIG. 7), while lower pulley 18 has a thin, annular plate 20, which fits into incision 13, designed to make the dividing of the strip 12 much easier, so that it can fit the upturned edge of sheet 2.

After strip 12 has been applied, sheets 2 and 3 are fed into a unit 21 (FIGS. 2 and 3) for connecting the sheets and for holding in place the expanding plastic material which is injected between the sheets at stage 10 before the application of strip 12.

Unit 21 is fitted with a casing 22 (FIG. 9), supported by a fixed frame 23, to which is connected lower link conveyor 24, and movable frame 25, connected to upper conveyor 26, also linked.

Conveyors 24 and 26, as previously described, act against the panel edges so as to hold in place the expanding plastic material; furthermore, a pair of lateral drive chains 27 are fitted, and act on the panels from both sides.

Lower conveyor 24 is made up of a number of links 24a and revolves continuously; it serves as a support for the panels. Upper conveyor 26, connected to the movable frame 25, can be adjusted vertically by means of pistons 28, so as to adapt to the various thicknesses of the panels. Upper conveyor 26 is also made up of a number of links 26a and revolves continuously.

Holding sections can be fitted to each of conveyors 24 and 26. The sections engage with sheets 2 and 3, which can be of various thicknesses and shapes, as mentioned previously. Thus, the holding-section sections must be rapidly interchangeable.

Figure 18:
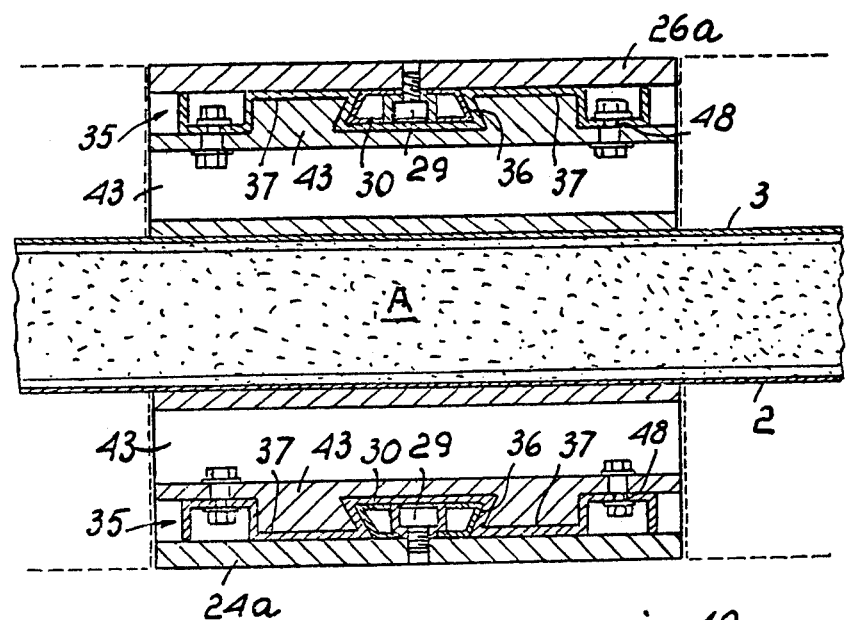
FIG. 18 is a sectional view of the unit shown in FIG. 8, shown lengthwise, i.e., in the direction of movement of the panels.
Figure 15:
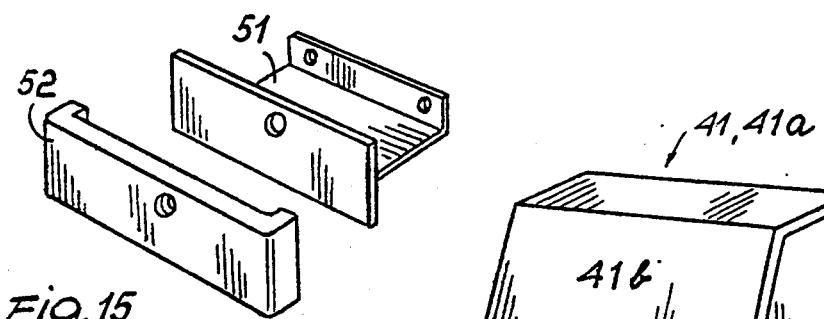
FIG. 15 is an exploded view of the push units of the bilateral chains of the unit shown in FIG. 8.
Figure 14:
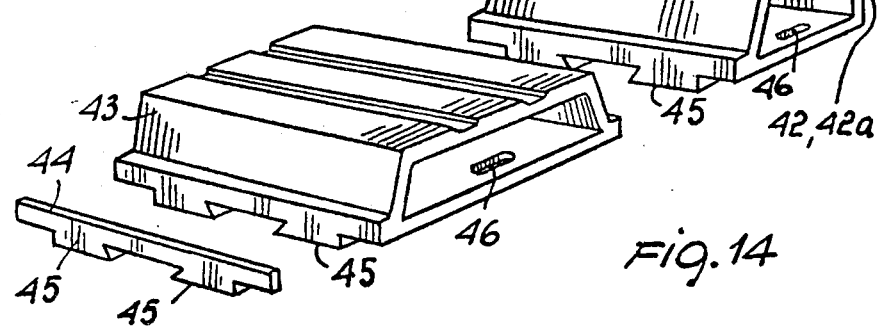
FIG. 14 is a perspective view of some of the different-shaped holding sections.

As seen in FIGS. 13 and 18, onto each link is screwed by means of screws 29, a dove-tail-shaped guide unit 30, which is situated lengthwise in relation to the link itself. Fitted into one or both ends of guide 30 is a thin, flexible strip 31, fixed at one part of its end 32 to unit 30, for example, by means of one of the above-mentioned screws 29 passed through hole 32b and thread 32c; at the other free end, the thin plate 31 is provided with pin 33, which is of a sufficient size to extend from unit 30 through hole 34 in it.

A support plate 35 can be fitted onto unit 30; plate 35 has a female groove on its underside 36, which fits onto unit 30, and on its topside, a pair of female grooves 37.

Plate 35 can be fixed to unit 30 by engaging spring pin 33 with hole 38, provided for this purpose.

Detachable-shaped blocks, which will be described later, are fitted onto plate 35, so as to form the trains 40, which make up the holding sections for the panel.

These trains comprise detachable end blocks 41 and 41a, whose outside edges 42 and 42a are perpendicular to the plane defined by the conveyors, intermediate detachable blocks 43, which conform to the shape of sheets 2 and 3, and distancing blocks 44, which allow the exact length of train 40 to be fixed; all of these detachable blocks have a pair of dove-tailed, male grooves 45 on their underside, so as to engage with the female grooves of the plate 35.

End blocks 41 and 41a have elongated holes 46 on their lower sides, through which are passed screws 47, which screw into holes 48 of plate 35 and connect the blocks to it; holes 46 are elongated, so as to allow adjustment to be made to the blocks, if need be.

In FIG. 13, holes 49 are shown for fixing the links 24a and 26a with any screw.

Train 40 is formed by fitting onto plate 35 the various detachable blocks 41, 41a, 43 and 44, in such a way that they are of a configuration conforming to the shape of the sheet with which they make contact.

As has been stated previously, there are lateral drive chains 27 (FIG. 9), which are supported in such a way that they can move parallel to the plane defined by the conveyors, through the action of pistons 50 (FIG. 12).

Chains 27 are made up of pressure units 51 (FIGS. 8-15), onto which is fixed a rubber plug 52 or a plug with a rubber coating, which acts as a push against the sides of end blocks 42 and 42a, while the panel is being held on both sides during its passage by the inside walls 41b of end blocks 41 and 41a.

Having fixed the distance between conveyors 24 and 26, according to the thickness of the panel to be produced, unit 21 is arranged as follows: the operator prepares various trains 40 by inserting onto plate 35 firstly the various detachable blocks 41, 43 and 41a, and finally distancing blocks 44, in such a way that they are of the configuration corresponding to the shape of the sheets; the operator then simply fits them onto units 30 by driving pins 33 into the corresponding holes 38, thus locking trains 40 laterally or bilaterally onto links 24a and 26a.

Should the operator wish to dismantle trains 40 in order to substitute others of a different shape, it is enough to disengage each single pin 33 from its corresponding hole 38, so that the trains can be easily removed from unit 30, without having to undo any other screws as was necessary in the past.

As can clearly be seen, the arrangement of unit 21, with the devices adopted, is extremely simple and quick to assemble, so that the whole apparatus need only be stopped for a short time.

Moreover, walls 42 and 42a of end blocks 41 and 41a, which are always perpendicular to the plane of conveyors 24 and 26, ensure that the size of plugs 51 need never be altered, an operation which has to be carried out with the apparatus currently in use.

For a complete description, it should be mentioned that at the exit to unit 21 is a cutter 53 for cutting up the panels into the lengths required, and conveyor 54 for taking away the cut panels.

FIG. 17 shows in section a panel which has no upper sheet, but a cardboard layer 55, instead. Strip 12 is not applied in this form of operation, although all other forms of operation are substantially the same as that described.

It will be apparent that the apparatus described above has many advantages; in particular, the new form of operation of unit 21 considerably reduces the rearrangement of the apparatus, since it enables the operator in an extremely short time, to replace trains 40 with others which can easily be fitted along unit 30 of each link 24a and 26a.

Furthermore, the particular shape of the end, detachable blocks does away with the need to replace plugs 52 on lateral chains 27, which need not be changed whatever the shape of the panel to be produced.

Finally, the panels obtained, because of the presence of strip 12, can be fitted together without the need for any insulating material between, since strip 12 provides both a thermal and sound barrier between sheets 2 and 3 of the panel.

While only several embodiments of the present invention have been shown and described, it will be obvious to those persons of ordinary skill in the art that many changes and modifications may be made thereunto without departing from the spirit and scope of the invention.

What is claimed is:

1. An apparatus for the continuous production of prefabricated insulating panels, comprising: a feeding station for a lower metal sheet and for an upper metal sheet; a rolling-mill train for shaping said sheets; a furnace for heating said sheets; a device for injecting expandable plastic material between said sheets; a joining unit for joining the sheets together and for holding the expanded plastic material in place, said joining unit having two link-type upper and lower conveyors for the sheets shaped by the rollingmills, at least one of said conveyors being adjustable so that the distance between them may be regulated according to the thickness of the panel, said conveyors being arranged to revolve continuously around rollers which rotate about horizontal axes, each link of said link-type conveyors including a transversely-extending, dove-tail-shaped, hollow coupling section mounted lengthwise on each adjacent link, and said joining unit also having holding sections on said conveyors for acting on the shaped surfaces of the sheets, said holding sections comprising a series of detachable blocks for the formation of trains having a shape which mates with the sheets, said joining unit also including two chain-mounted pressure units arranged to be continuously driven by rollers revolving around vertical axes and including support sections for pushing laterally against the panels; a support plate engageable in mating relationship with said dove-tail section on which plate said series of detachable blocks are receivable; and a cutter for cutting the finished panel.

2. The apparatus according to claim 1 additionally including a strip-insertion unit, disposed immediately after the device for injecting the expandable plastic material, for the insertion between the edges of the lower and upper sheets of a strip of elastomeric material suitable for joining the sheets together, as well as for forming a section of the side edges of the finished panel.

3. The apparatus according to claim 2, wherein said unit for inserting the strip includes a pair of spools on which the strip is wound sideways, and a plurality of guides, said spools feeding the strip through said guides, which convey the strip onto turned edges of the sheets.

4. The apparatus according to claim 3, wherein the strip has on one side an incision for fitting onto the upturned edge of the lower sheet, and on the other side, a protusion for engaging with the turned edge of the upper sheet.

5. The apparatus according to claim 4, wherein said guides include an upper pulley and a lower pulley, the upper pulley having a groove into which fits the protusion of said strip, and the lower pulley including a thin, annular plate for fitting into the incision of said strip.

6. The apparatus according to claim 1, wherein each dove-tailed coupling section has a hole formed therein, and wherein a flexible plate is inserted in at least one end of said coupling section, said flexible plate having one end fixed to said coupling section and another end having a pin suitable for spring driving into said hole provided in said section and into a hole on said support plate to thereby lock said support plate laterally onto a respective said link.

7. The apparatus according to claim 1, wherein said support plate for receiving the detachable, shaped blocks has formed on its bottom surface a female groove for mating engagement with said coupling section and on its top surface a pair of female grooves for mating engagement with corresponding male projections provided on the shaped, detachable blocks.

8. The apparatus according to claim 1, wherein said detachable, shaped blocks comprise end blocks, inside blocks and spacing blocks, which can be fixed onto said plate to form the train.

9. The apparatus according to claim 8, wherein said end detachable blocks have elongated holes formed on their under sides, in order to allow them to be screwed to said plate, said holes being so designed as to allow the position of the end blocks to be adjusted.

10. The apparatus according to claim 8, wherein said pressure units of the lateral drive chains have plugs mounted thereon, and wherein said detachable end blocks have on their outsides a side wall perpendicular to the plane defined by the conveyors for engaging with said plugs mounted on said pressure units.

* * * * *